(12) United States Patent
Wind (10) Patent No.: US 12,057,708 B2
(45) Date of Patent: Aug. 6, 2024

(54) RECHARGEABLE ELECTRONIC LOCK

(71) Applicant: ZEPHYR LOCK, LLC, Newtown, CT (US)

(72) Inventor: Patrick Wind, Darien, CT (US)

(73) Assignee: ZEPHYR LOCK, LLC, Newtown, CT (US)

( * ) Notice: Subject to any disclaimer, the term of this patent is extended or adjusted under 35 U.S.C. 154(b) by 0 days.

(21) Appl. No.: 17/940,714

(22) Filed: Sep. 8, 2022

(65) Prior Publication Data

US 2023/0081071 A1 Mar. 16, 2023

Related U.S. Application Data

(60) Provisional application No. 63/242,947, filed on Sep. 10, 2021.

(51) Int. Cl.
*H02J 50/10* (2016.01)
*G07C 9/00* (2020.01)
*H02J 7/35* (2006.01)
*H02J 50/00* (2016.01)

(52) U.S. Cl.
CPC .......... *H02J 50/10* (2016.02); *G07C 9/00174* (2013.01); *H02J 7/35* (2013.01); *H02J 50/005* (2020.01); *G07C 9/00912* (2013.01); *H02J 2300/24* (2020.01)

(58) Field of Classification Search
CPC .......... H02J 50/10; H02J 50/00; H02J 50/005; G07C 9/00

See application file for complete search history.

(56) References Cited

U.S. PATENT DOCUMENTS

| | | | |
|---|---|---|---|
| 8,922,333 B1 * | 12/2014 | Kirkjan | G07C 9/00309 340/5.1 |
| 9,127,477 B1 | 9/2015 | Yang | |
| 9,235,942 B2 * | 1/2016 | Chen | H02J 50/10 |
| 11,127,233 B2 * | 9/2021 | Tartal | E05B 47/026 |
| 2007/0056338 A1 * | 3/2007 | Sabo | E05B 63/18 70/279.1 |
| 2007/0240464 A1 | 10/2007 | Miller et al. | |
| 2010/0073129 A1 * | 3/2010 | Pukari | E05B 47/02 455/41.1 |
| 2013/0283866 A1 | 10/2013 | Houlihan et al. | |
| 2014/0340032 A1 * | 11/2014 | Curtis | H02J 50/12 320/108 |
| 2015/0107316 A1 * | 4/2015 | Kirkjan | G07C 9/00309 70/275 |
| 2016/0322847 A1 * | 11/2016 | Geiszler | H02J 50/10 |
| 2016/0350989 A1 * | 12/2016 | Chang | E05B 47/00 |
| 2017/0002586 A1 | 1/2017 | Lee | |
| 2017/0191287 A1 * | 7/2017 | Mittleman | E05F 15/72 |

(Continued)

FOREIGN PATENT DOCUMENTS

| | | | | |
|---|---|---|---|---|
| CN | 107979148 A | * | 5/2018 | ............. E05B 47/00 |
| JP | 2003041817 A | * | 2/2003 | |

OTHER PUBLICATIONS

Notice of Allowance dated Sep. 20, 2023.

*Primary Examiner* — Rexford N Barnie
*Assistant Examiner* — Joseph N Inge
(74) *Attorney, Agent, or Firm* — CANTOR COLBURN LLP (57) ABSTRACT

An electronic lock, including: a power storage device; and a means for providing power to the power storage device.

11 Claims, 5 Drawing Sheets

(56) References Cited

U.S. PATENT DOCUMENTS

| | | |
|---|---|---|
| 2017/0278880 A1 | 9/2017 | Bryla et al. |
| 2018/0033311 A1 | 2/2018 | Berggren |
| 2018/0073542 A1* | 3/2018 | Saigo .................... H02J 50/12 |
| 2018/0160835 A1* | 6/2018 | Garrity ............... E05B 47/0001 |
| 2018/0216364 A1 | 8/2018 | Wind et al. |
| 2018/0323632 A1* | 11/2018 | Astarabadi .......... E05B 47/0012 |
| 2019/0118765 A1 | 4/2019 | House |
| 2020/0327757 A1 | 10/2020 | Kelley et al. |
| 2021/0019972 A1* | 1/2021 | Roper ................. E05B 47/0607 |
| 2021/0062546 A1* | 3/2021 | Robertson ............ G07C 9/0073 |
| 2021/0159470 A1 | 5/2021 | Duggan et al. |
| 2021/0376657 A1* | 12/2021 | Basilious ............... G08B 13/08 |
| 2022/0122392 A1 | 4/2022 | Wind et al. |
| 2022/0345219 A1* | 10/2022 | Apetrei ................... H04L 12/10 |
| 2023/0043157 A1* | 2/2023 | Zeine ..................... H02J 50/70 |
| 2023/0081071 A1 | 3/2023 | Wind |

\* cited by examiner

RECHARGEABLE ELECTRONIC LOCK

CROSS REFERENCE TO RELATED APPLICATIONS

This application claims priority to U.S. Provisional Application Ser. No. 63/242,947 filed on Sep. 10, 2021, the entire contents of which are incorporated herein by reference thereto.

BACKGROUND

Exemplary embodiments of the present disclosure relate generally to electronic locks that require a source of power.

Locks are used to secure or lock the door of lockers, cabinets, toolboxes, desks, access doors, drawers and other such enclosures. In some applications and where an electronic lock is used a power source is required to operate electrical components (e.g., keypad, motor, solenoid, radio frequency identification (RFID). Typically, this is provided by a battery which over time will degrade and have to be replaced. Additionally, this is provided by wiring the lock to a power source which requires locks that are integrated in the frame of the locker or cabinet, or wiring that traverses the hinged portion of the door, neither of which may be desirable.

Accordingly, it is desirable to provide an electronic lock with a means for providing an extended battery life as well as a system where any integrated wiring of a power supply is connected to the lock wirelessly.

BRIEF DESCRIPTION

Disclosed is an electronic lock, including: a power storage device; and a means for providing power to the power storage device.

In addition to one or more of the features described above, or as an alternative to any of the foregoing embodiments, the means for providing power to the power storage device is an inductive coil arrangement electrically coupled to the power storage device in order to provide a charging current to the power storage device.

In addition to one or more of the features described above, or as an alternative to any of the foregoing embodiments, the inductive coil arrangement comprises a transmitting coil and a receiving coil.

In addition to one or more of the features described above, or as an alternative to any of the foregoing embodiments, the receiving coil is located within a bolt of the electronic lock.

In addition to one or more of the features described above, or as an alternative to any of the foregoing embodiments, the receiving coil is located within any portion of the electronic lock.

In addition to one or more of the features described above, or as an alternative to any of the foregoing embodiments, the transmitting coil is located within a frame of a locker.

In addition to one or more of the features described above, or as an alternative to any of the foregoing embodiments, the transmitting coil is located within a frame of a locker.

In addition to one or more of the features described above, or as an alternative to any of the foregoing embodiments, the means for providing power to the power storage device also includes photovoltaic cells located on a surface of the electronic lock, the photovoltaic cells being electrically coupled to the power storage device in order to provide a charging current to the power storage device.

In addition to one or more of the features described above, or as an alternative to any of the foregoing embodiments, the power storage device is a rechargeable battery.

In addition to one or more of the features described above, or as an alternative to any of the foregoing embodiments, the means for providing power to the power storage device is photovoltaic cells located on a surface of the electronic lock, the photovoltaic cells being electrically coupled to the power storage device in order to provide a charging current to the power storage device.

Also disclosed is a locker, including: an electronic lock secured to a door of the locker, the electronic lock, including: a power storage device; and a means for providing power to the power storage device.

In addition to one or more of the features described above, or as an alternative to any of the foregoing embodiments, the means for providing power to the power storage device is an inductive coil arrangement electrically coupled to the power storage device in order to provide a charging current to the power storage device.

In addition to one or more of the features described above, or as an alternative to any of the foregoing embodiments, the inductive coil arrangement comprises a transmitting coil and a receiving coil.

In addition to one or more of the features described above, or as an alternative to any of the foregoing embodiments, the receiving coil is located within a bolt of the electronic lock.

In addition to one or more of the features described above, or as an alternative to any of the foregoing embodiments, the transmitting coil is located within a frame of a locker.

In addition to one or more of the features described above, or as an alternative to any of the foregoing embodiments, the means for providing power to the power storage device also includes photovoltaic cells located on a surface of the electronic lock, the photovoltaic cells being electrically coupled to the power storage device in order to provide a charging current to the power storage device.

In addition to one or more of the features described above, or as an alternative to any of the foregoing embodiments, the means for providing power to the power storage device also includes photovoltaic cells located on a surface of the door of the locker or any surface of the locker.

In addition to one or more of the features described above, or as an alternative to any of the foregoing embodiments, the power storage device is a rechargeable battery.

In addition to one or more of the features described above, or as an alternative to any of the foregoing embodiments, the means for providing power to the power storage device also includes photovoltaic cells located on a surface of the electronic lock, the photovoltaic cells being electrically coupled to the power storage device in order to provide a charging current to the power storage device.

Also disclosed is a method for recharging a rechargeable battery of an electronic lock, including: providing power to the rechargeable battery by an inductive coil arrangement electrically coupled to the rechargeable battery in order to provide a charging current to the rechargeable battery and/or photovoltaic cells located on a surface of the electronic lock, the photovoltaic cells being electrically coupled to the rechargeable battery in order to provide a charging current to the rechargeable battery.

In addition to one or more of the features described above, or as an alternative to any of the foregoing embodiments, the inductive coil arrangement comprises a transmitting coil and a receiving coil and the receiving coil is located within a bolt of the electronic lock.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Referring now to FIGS. 1-6, an electronic lock 10 according to various embodiments of the present disclosure is illustrated. The electronic lock 10 may be operated by a keypad 12 where a user inputs a combination and an electrically operated solenoid or motor 14 operably coupled to a bolt or latch 16 moves the bolt or latch 16 from a locking position to an unlocking position. In the locking position the bolt or latch 16 engages a hasp or opening of a frame 18 of a locker 20 in which the electronic lock 10 is employed. In the illustrated embodiment, the electronic lock 10 is secured to a door 22 of the locker 20.

In operation the electronic lock 10 is unlocked by providing the proper combination to the electronic lock 10 via the keypad 12 or a touch screen (not shown). Once this combination is provided the motor or solenoid 14 is energized and the bolt or latch 16 of the lock 10 is moved from a locking position to an unlocking position. Alternatively and when the proper combination is provided to the lock 10 a knob or handle may be released and the knob or handle is operably coupled to the bolt or latch 16 in order to move the bolt or latch 14 from the locking position to the unlocking position.

Figure 1:
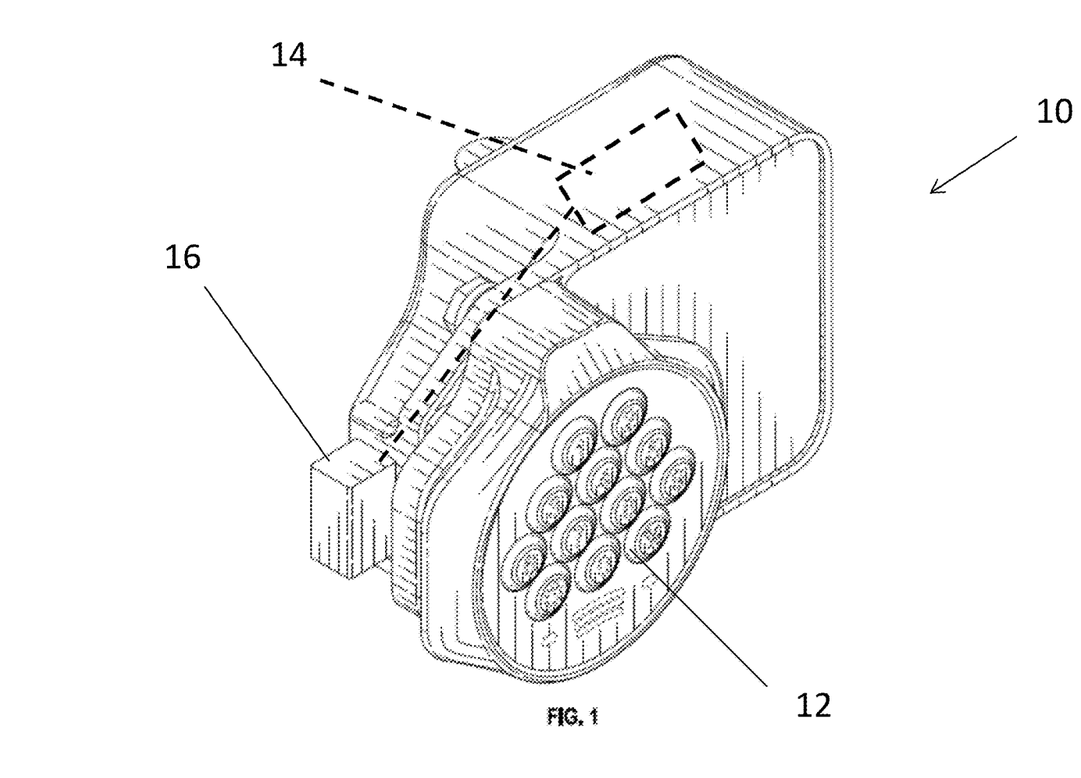
FIG. 1 is a front perspective view of a lock according to an embodiment of the present disclosure.
Figure 2:
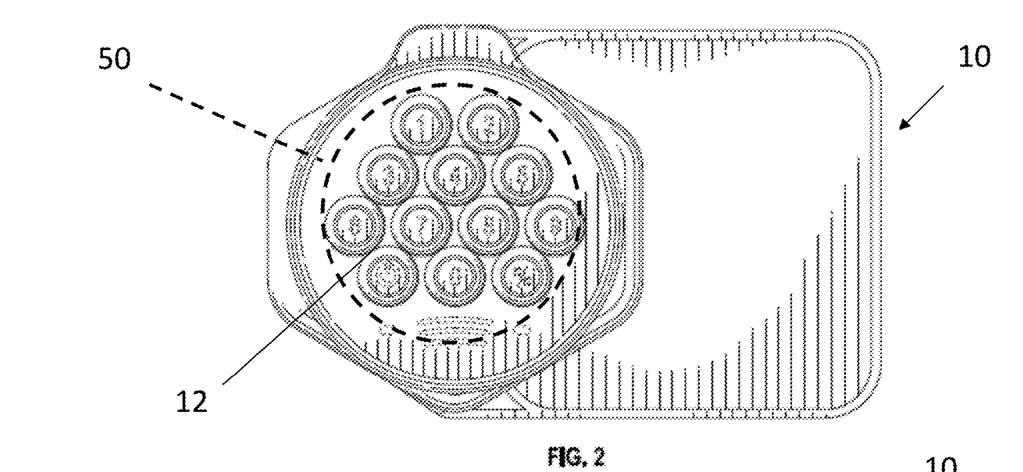
FIG. 2 is a front plan view of the lock of illustrated in FIG. 1.
Figure 3:
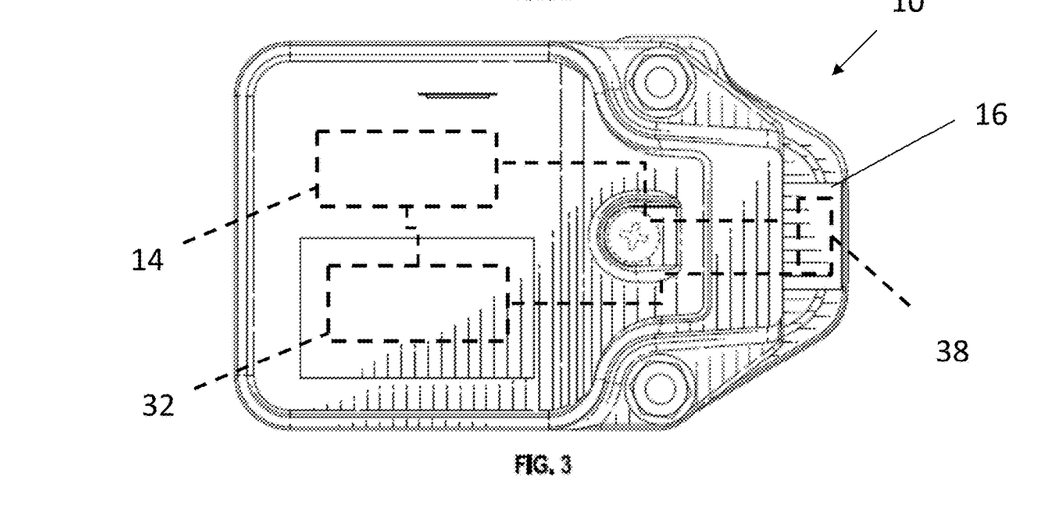
FIG. 3 is a rear plan view of the lock of illustrated in FIG. 1.
Figure 4:
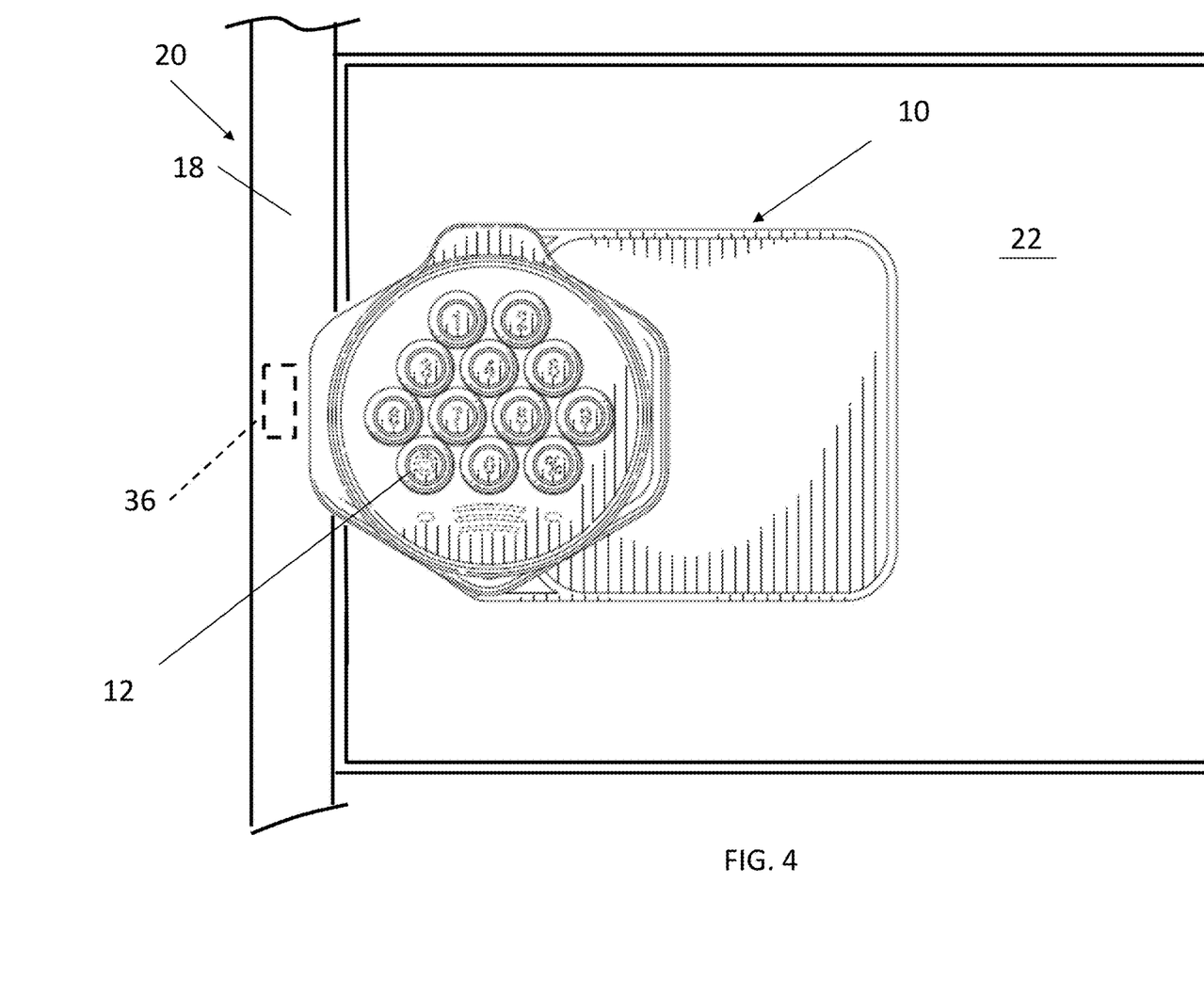
FIG. 4 is a front view of the lock secured to a door of a locker wherein the locker door is closed.
Figure 5:
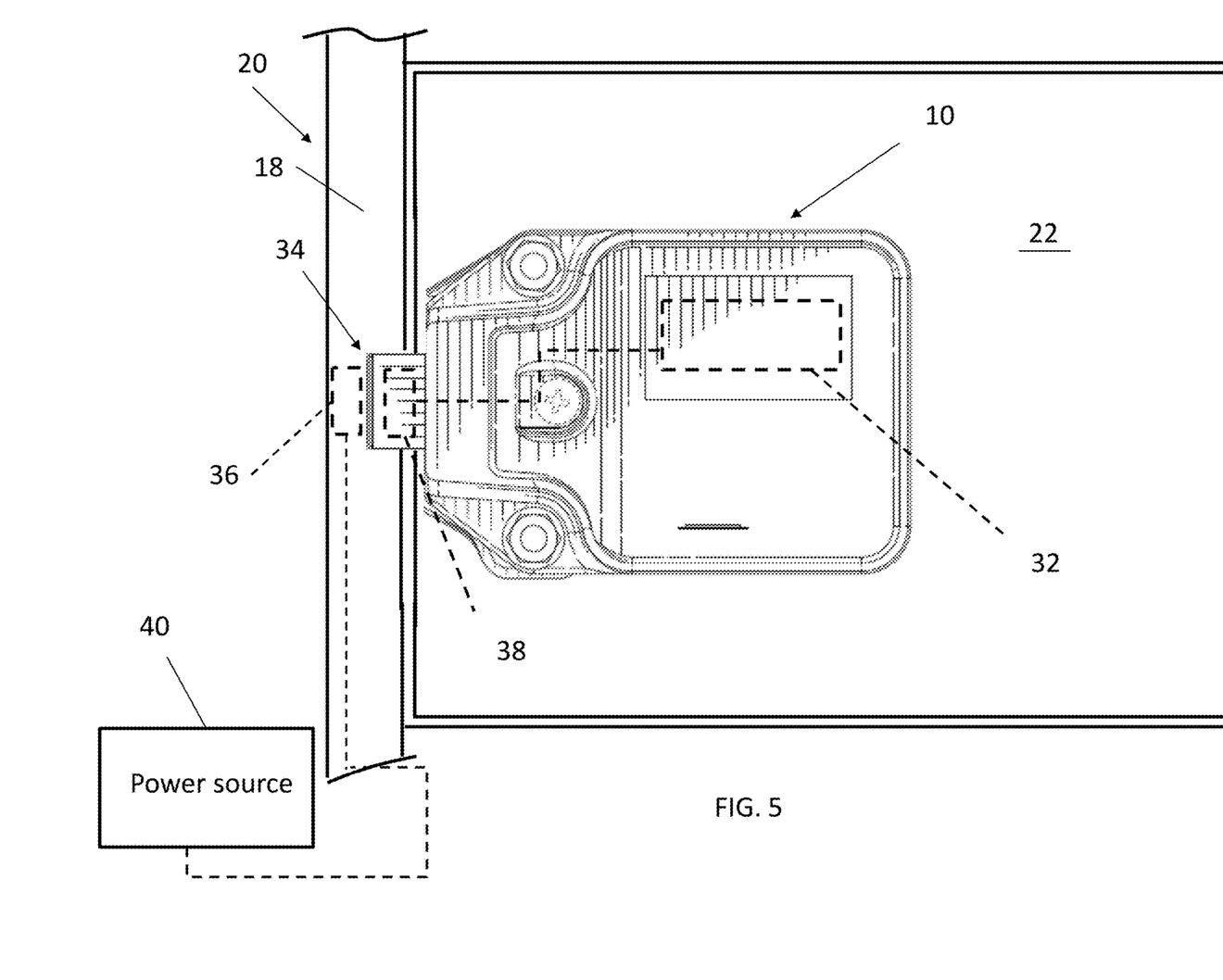
FIG. 5 is a rear view of the lock secured to a door of a locker wherein the locker door is closed.
Figure 6:
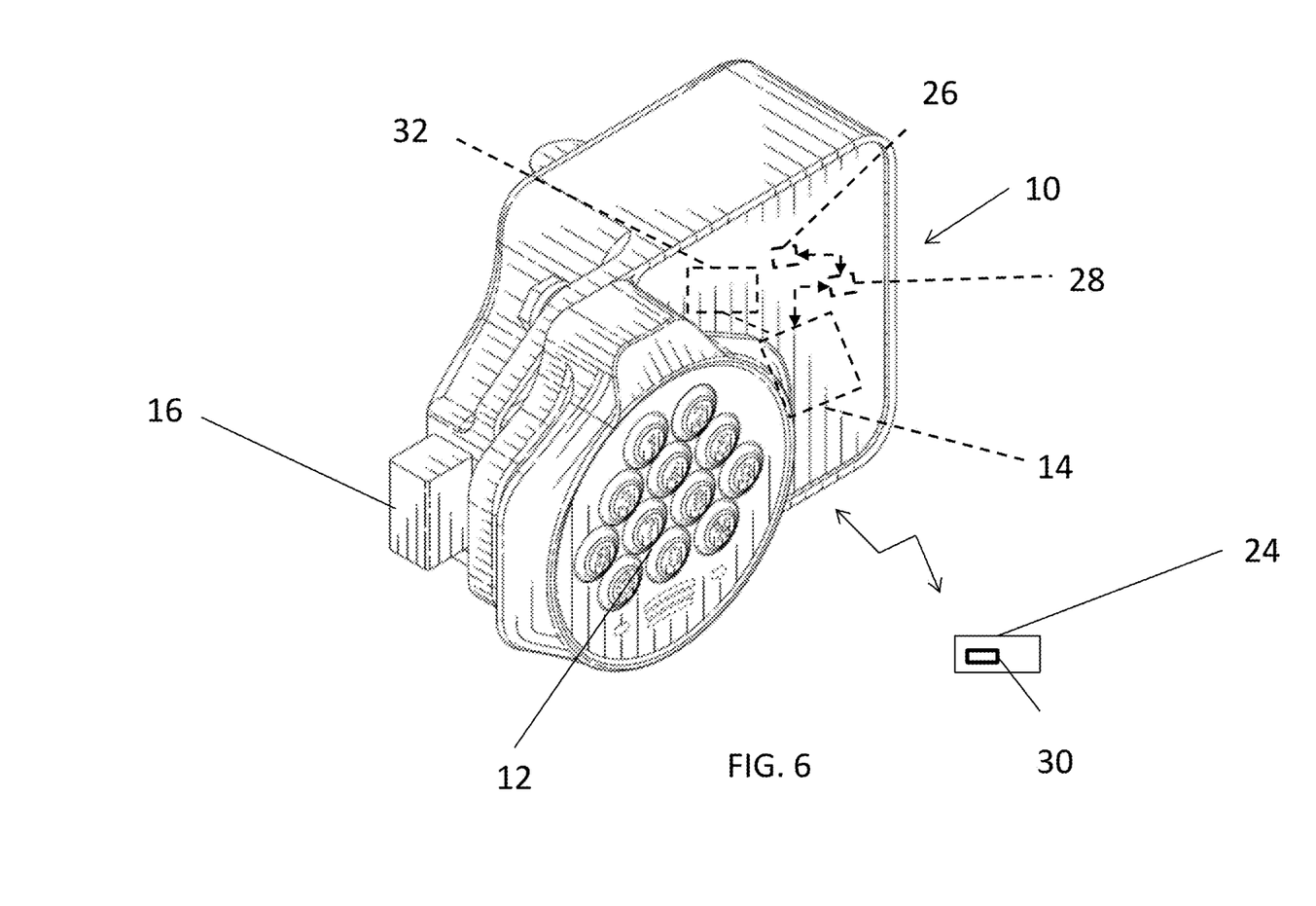
FIG. 6 is a front perspective view of a lock according to an embodiment of the present disclosure.

In another embodiment and as illustrated schematically in FIG. 6, the motor 14 is energized via wireless communication (e.g., Bluetooth, WiFi, RFID, etc. or any other equivalent communication) with a key FOB, wireless key or other equivalent device 24 that communicates wirelessly with a receiver or receiver/transmitter 26 in operable communication with a microprocessor 28 or other equivalent device or the receiver/transmitter 26 directly communicates with the motor or solenoid 14. Accordingly and when the key FOB or other equivalent device 24 is within range of the receiver or receiver/transmitter 26 a transmitter 30 of the key FOB or other equivalent device 24 provides an actuation code to the motor or solenoid 14 and/or the microprocessor 28 or other equivalent device and the motor or solenoid 14 is actuated in order to allow provide the desire movement of the latch or bolt 16.

In order to provide the required power to the motor or solenoid 14, the microprocessor 28 and the receiver/transmitter 26 an internal power supply such as a battery or power storage device 32 is provided in order to provide the aforementioned functions of unlocking and/or deployment of a moveable knob. In accordance with one embodiment of the present disclosure the battery or power storage device 32 is a rechargeable battery or rechargeable power storage device 32.

In order to a charge the battery or power storage device 32 an inductive coil arrangement 34 is provided. The inductive coil arrangement 34 is electrically coupled to the rechargeable battery or rechargeable power storage device 32 in order to provide a charging current to the rechargeable battery or rechargeable power storage device 32. The inductive coil arrangement 34 will include a transmitting coil 36 and a receiving coil 38 so that power can be inductively provided to the electronic lock 10 in order to inductively charge the rechargeable battery or rechargeable power storage device 32. The transmitting coil will be directly wired to a source of power 40 including but not limited to standard A/C power or a low voltage power line including but not limited to power over ethernet (PoE) or any low voltage necessary to provide the desired inductive charging of the rechargeable battery or rechargeable power storage device 32. Non limiting examples of power over ethernet (PoE) may be 24V, 48V and 54V and ranges thereof. Of course, other voltages are considered to be within the scope of the present disclosure.

By powering the electronic lock 10 with low voltage power over ethernet (PoE) or other low voltage line, regulatory compliance standards are different and the electronic locks can operate because they are actually being powered by the rechargeable battery or rechargeable power storage device 32 located within the electronic lock 10. In one non-limiting embodiment, the low voltage line is providing a trickle charge. Power over ethernet (PoE) lines are very convenient since they are easy to work with and run lines.

As such and in one non-limiting configuration, the transmitting coil 36 of the inductive coil arrangement 34 is located in the frame 18 of the locker 20. Alternatively, the transmitting coil 36 of the inductive coil arrangement 34 is located on or near a hasp (not shown) secured to the frame 18 of the locker 20. In addition, the receiving coil 38 of the inductive coil arrangement 34 is located in the electronic lock 10. One non-liming location could be within the bolt or latch 16 of the electronic lock 10 such that when the locker door 22 is in the closed position (see FIGS. 4 and 5) the transmitting coil 36 of the inductive coil arrangement 34 is located adjacent to the receiving coil 38 of the inductive coil arrangement 34 such that power can be transferred to the rechargeable battery or rechargeable power storage device 32. Of course numerous locations are contemplated as long the transmitting coil 36 and the receiving coil 38 of the inductive coil arrangement 34 are close enough to each other such that when the door 22 the electronic lock 10 is secured to is in a closed position the rechargeable battery or rechargeable power storage device 32 is capable of being inductively charged.

In addition, a plurality of lockers 20 can be provided where multiple electronic locks 10 are provided and a plurality of inductive coil arrangements 34 are provided and each of the transmitting coils 36 of the plurality of inductive coil arrangements 34 are coupled to the power source 40, which in one non-limiting embodiment may be a low voltage power source. In addition and in one non-limiting embodiment, the a single power source 40 may be connected to the various transmitting coils 36 of the plurality of inductive coil arrangements 34. Moreover and in the event of a power loss the electronic locks 10 will still be able to function as they can be operated from the rechargeable battery or rechargeable power storage device 32.

In yet another alternative embodiment the rechargeable battery or rechargeable power storage device 32 of the electronic lock 10 may charged by photovoltaic cells 50 (See FIG. 2) located on a surface of the electronic lock 10 that is exposed to sunlight. Alternatively and/or in addition to the photovoltaic cells 50 located on the surface of the electronic lock 10 the photovoltaic cells 50 may be located on any surface of the locker such as the locker door, the frame or any surface where a suitable amount of light for charging is provided. The photovoltaic cells 50 may also be in any location on the surface of the lock as long as it is capable of being exposed to light in order to provide a trickle charge or current to the rechargeable battery or rechargeable power storage device 32. In one embodiment, the photovoltaic cells 50 may be a layer on or surrounding the keypad. Alternatively, the photovoltaic cells 50 may be located on any surface of the lock. In yet another alternative discrete areas of the lock surface may have photovoltaic cells 50 disposed thereon. In yet another alternative the photovoltaic cells 50 may comprise a flexible sheet applied to the surface of the lock. The flexible sheet may surround and/or cover the buttons of the lock.

In one embodiment, the photovoltaic cells 50 are used in combination with the inductive coil arrangement 34 to charge the rechargeable battery or rechargeable power storage device 32. Alternatively and in yet another alternative embodiment, the photovoltaic cells 50 are used exclusively to charge the rechargeable battery or rechargeable power storage device 32. In other words and in this embodiment, the photovoltaic cells 50 replace the inductive coil arrangement 34.

It being understood that while certain lock face configurations are illustrated in the attached FIGS., it is understood that the embodiments of the present disclosure are applicable to any lock face configuration or any lock configuration and the embodiments of the present disclosure are not limited to the specific configurations of the locks illustrated in the attached FIGS.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An electronic lock, comprising:
    a power storage device; and
    an inductive coil arrangement comprising a transmitting coil and a receiving coil, the inductive coil arrangement being electrically coupled to the power storage device in order to provide a charging current to the power storage device, the receiving coil being located within the electronic lock and the transmitting coil being directly wired to a source of power, the source of power being power over ethernet (PoE), the receiving coil being completely enclosed within a rectangular bolt of the electronic lock.

2. The electronic lock as in claim 1, wherein the transmitting coil is located within a frame of a locker.

3. The electronic lock as in claim 1, further comprising photovoltaic cells located on a surface of the electronic lock, the photovoltaic cells being electrically coupled to the power storage device in order to provide a charging current to the power storage device.

4. The electronic lock as in claim 2, further comprising photovoltaic cells located on a surface of the electronic lock, the photovoltaic cells being electrically coupled to the power storage device in order to provide a charging current to the power storage device.

5. The electronic lock as in claim 1, wherein the power storage device is a rechargeable battery.

6. A locker, comprising:
    an electronic lock secured to a door of the locker, the electronic lock, comprising:
    a power storage device; and
    an inductive coil arrangement comprising a transmitting coil and a receiving coil, the inductive coil arrangement being electrically coupled to the power storage device in order to provide a charging current to the power storage device, the receiving coil being located within the electronic lock and the transmitting coil being directly wired to a source of power, the source of power being power over ethernet (PoE), the receiving coil being completely enclosed within a rectangular bolt of the electronic lock.

7. The locker as in claim 6, wherein the transmitting coil is located within a frame of the locker.

8. The locker as in claim 7, further comprising photovoltaic cells located on a surface of the electronic lock, the photovoltaic cells being electrically coupled to the power storage device in order to provide a charging current to the power storage device.

9. The locker as in claim 6, wherein the power storage device is a rechargeable battery.

10. The locker as in claim 6, further comprising photovoltaic cells located on a surface of the electronic lock, the photovoltaic cells being electrically coupled to the power storage device in order to provide a charging current to the power storage device.

11. A method for recharging a rechargeable battery of an electronic lock, comprising:
    providing power to the rechargeable battery by an inductive coil arrangement electrically coupled to the rechargeable battery in order to provide a charging current to the rechargeable battery and photovoltaic cells located on a surface of the electronic lock, the photovoltaic cells being electrically coupled to the rechargeable battery in order to provide a charging current to the rechargeable battery, the inductive coil arrangement comprising a transmitting coil and a receiving coil, the inductive coil arrangement being electrically coupled to the rechargeable battery in order to provide a charging current to the rechargeable battery, the receiving coil being located within the electronic lock and the transmitting coil being directly wired to a source of power, the source of power being power over ethernet (PoE), the receiving coil being completely enclosed within a rectangular bolt of the electronic lock.

* * * * *